United States Patent [19]

Dean et al.

[11] Patent Number: 4,570,658
[45] Date of Patent: Feb. 18, 1986

[54] PYROTECHNIC-ACTUATED DUAL AIR VALVE

[75] Inventors: Charles F. Dean; Edward W. Lauer; David L. Riggs, all of Ridgecrest, Calif.

[73] Assignee: The United States of America as represented by the Secretary of the Navy, Washington, D.C.

[21] Appl. No.: 523,499

[22] Filed: Aug. 15, 1983

[51] Int. Cl.⁴ ............... F16K 31/12; F16K 11/06
[52] U.S. Cl. ................... 137/68.2; 137/67; 137/625.18; 137/68.1
[58] Field of Search ............. 137/67, 68 A, 68 R, 137/625.12, 70

[56] References Cited

U.S. PATENT DOCUMENTS

| | | | |
|---|---|---|---|
| 2,796,074 | 6/1957 | Daudelin | 137/68 A |
| 2,997,051 | 8/1961 | Williams | 137/68 A |
| 3,033,216 | 7/1962 | Morgan et al. | 137/68 A |
| 3,093,151 | 6/1963 | Merkowitz | 137/68 A |
| 3,111,133 | 11/1963 | Fulton et al. | 137/68 A |
| 3,216,438 | 11/1965 | Prono et al. | 137/68 A |
| 3,308,842 | 3/1967 | Martin | 137/68 |
| 3,430,442 | 3/1969 | Rabe et al. | 137/68 A |
| 3,478,760 | 11/1969 | Hosek | 137/68 |
| 3,511,183 | 5/1979 | Geffner | 102/70.2 |
| 3,638,669 | 2/1972 | Feight et al. | 137/68 |
| 3,776,276 | 12/1973 | Stiltner | 137/625.18 |
| 3,889,703 | 6/1975 | Keathley | 137/67 |
| 4,149,555 | 4/1979 | Hardesty | 137/68 A |
| 4,188,886 | 2/1980 | Brauer et al. | 102/223 |

Primary Examiner—Martin P. Schwadron
Assistant Examiner—John S. Starsiak, Jr.
Attorney, Agent, or Firm—Robert F. Beers; W. Thom Skeer

[57] ABSTRACT

A pyrotechnically actuated dual air valve is hermetically sealed on both inlet and both outlet ports of static and dynamic air ducts until the dual air valve is actuated by a squib charge. A single piston, when activated by the squib charge, concomitantly opens all four hermetic seals to allow separate static and dynamic air flows through the dual air valve.

1 Claim, 1 Drawing Figure

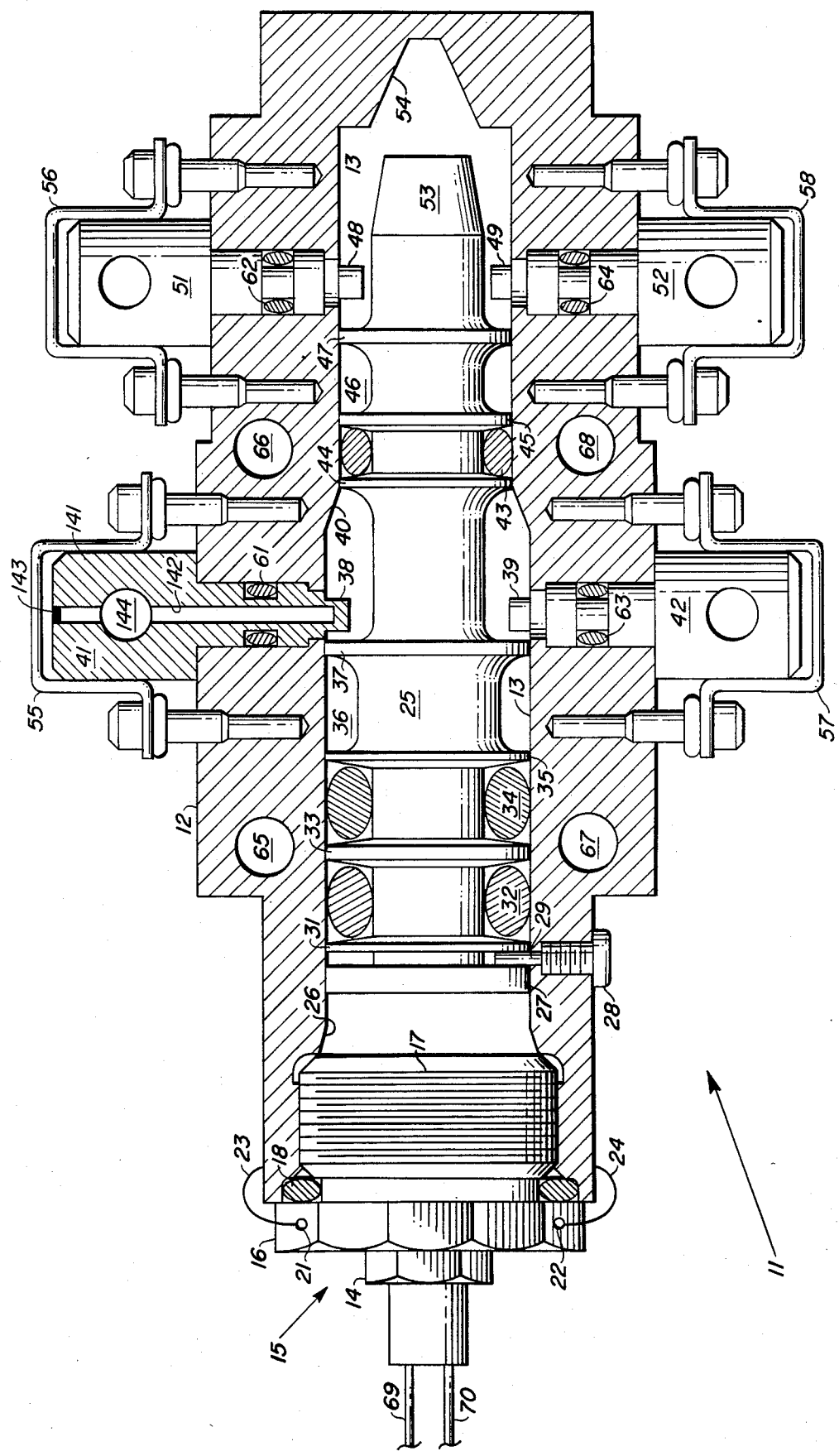

4,570,658

PYROTECHNIC-ACTUATED DUAL AIR VALVE

BACKGROUND OF THE INVENTION

1. Field of the Invention

The present invention pertains to the field of mechanics, and more specifically to the field of fluid mechanics. In particular, the invention is directed to a pyrotechnically actuated, hermetically sealed, dual air valve that is inoperative until activated to concomitantly provide two separate air pressure differentials.

2. Description of the Prior Art

An erecting type air pressure probe that uses a pyrotechnically actuated, hermetically sealed dual air valve is known to be used in a missile environment. Although sufficient for its designed purpose, this erecting type air pressure probe is inherently limited in its applications in that it is necessary that the air probe be extended from a missile exterior skin to be activted. In a confined environment such as where a missile is being deployed from a launching tube, substantial missile and/or tube damage, or an aborted firing, could be incurred if the air pressure probe should inadvertently be erected through the missile skin while the missile is still in its launching tube.

Other probe designs have used stored mechanical energy, such as preloaded springs, or lanyards attached between the probe assembly and the missile launching apparatus to activate the probe after the missile has travelled a predetermined distance from the launcher. Some configurations have included external tear strips attached by a lanyard to the launching apparatus. When the tear strips are torn away, the probe mechanism is exposed which then activates the fuze system.

Actuation mechanisms using external hardware or external probe air scopes are useful in air launched missiles, but cannot be used in surface launched or tube launched missiles where external structures or probes interfere with the launcher.

Other prior art devices have generally described gas actuated cartridges used to move a sliding member (piston) in a valve housing (cylinder) to open an internal valve which then allows fluid to flow through the valve.

In view of the prior art, there remains a long felt need for an electronically controlled, pyrotechnically actuated, hermetically sealed, dual air valve capable of being positioned within a missile body remotely oriented from a missile's external air inlets and obtaining its air pressure sources internal to the missile.

SUMMARY OF THE INVENTION

The invention is a pyrotechnically actuated dual air valve providing hermetically sealed static and dynamic air ports for application as part of a missile safe-arm fuze system. The device is designed in such manner that it can be wholly contained within the missile body obtaining its air pressure sources from the missile interior air system. The invention comprises a housing containing a one shot pyrotechnically actuated piston. The piston is provided with flanges that cut, when the piston is actuated, shear nipples (on each static and dynamic air port) that hermetically seal the dual air valve prior to activation. O-ring seals disposed on said piston provide separate static and dynamic air flow channels through the housing when the dual air valve is actuated.

No mechanical energy is stored in the dual air valve mechanism prior to activation. In addition, the unit is hermetically sealed to prevent entrance of dirt or moisture which may degrade operation of the device after extended storage intervals. Furthermore, it is unnecessary to extend the valve or components thereof external to the missile skin since the valve invention obtains its air source from the missile internal air system.

OBJECTS OF THE INVENTION

An object of this invention is to provide an improved air valve.

It is a further object of the invention to provide a pyrotechnically actuated air valve having static air input/output ports separate from dynamic air input/output ports to provide a dual air valve.

A further object of the invention is to provide a dual air valve for use in a safe-arm missile fuze system such that said air valve is hermetically sealed on both static and dynamic air input ports and both static and dynamic air output ports; said static and dynamic air input ports connected to the missile internal air supply and said static and dynamic air output ports being connected to the missile fuze.

Another object of the invention is to provide a dual air valve that can be positioned anywhere within the missile body and that obtains its static and dynamic air supply from the missile air supply such that it is not necessary that the air valve extend from the missile surface to obtain its air supply. Another object of the invention is to provide a dual air valve having few moving components, high reliability of operation, and long life.

Further objects and advantages of the present invention will emerge from a description which follows of the preferred embodiment of the dual air valve according to the invention given with reference to the accompanying drawing figure.

BRIEF DESCRIPTION OF THE DRAWING

The FIGURE provides a view of the dual air valve with the housing, O-rings, and one air inlet port in cross section.

DESCRIPTION OF THE PREFERRED EMBODIMENT

Referring to the figure, a partially cross-sectioned view of the pyrotechnically actuated dual air valve 11 is given. A valve housing 12, in cross-section, is provided with a centrally positioned, cylindrical, piston bore 13. Although not necessarily limited thereto, valve housing 12 can be fabricated from a block of aluminum.

A pyrotechnic device (squib) 14 is disposed on a stored end 15 of valve housing 12, and is removably contained in a pyrotechnic housing 16. Stored end 15 of valve housing 12 and pyrotechnic housing 16 are provided with mating threads 17 and a first O-ring seal 18. Pyrotechnic housing 16 is further provided with lock holes 21 and 22 and a lock wire 23 for fast engagement with valve housing 12 to prevent pyrotechnic housing 16 from unscrewing due to missile vibration during flight. Squib 14, energized by electrical leads 69 and 70, likewise is conventionally provided with mating threads (not shown) for mounting into pyrotechnic housing 16 and is provided with similar lock holes and a lock wire (not shown) for engagement with valve housing 12.

Piston bore 13 is designed for slidable movement of a valve piston 25, preferably made of steel, though not necessarily limited thereto, and is provided with a first piston bore truncation 26 capable of converging a volume of expanding gases from pyrotechnic housing 16, when squib 14 is actuated, onto a piston base, first flange 27. A locking screw 28 having a shear pin extension 29 is set between first flange 27 and a second flange 31 of piston 25 to contain piston 25 in a stored position until squib 14 is fired (actuated). On firing of squib 14, first flange 27 cuts shear pin extension 29 and permits piston 25 to move to the right in the figure.

A second O-ring seal 32 is disposed between second flange 31 and a third flange 33 of piston 25 for containment of expanding gases of squib 14. A third O-ring seal 34 is likewise disposed between third flange 33 and a fourth flange 35 of piston 25 to additionally seal off expanding gases from squib 14 and to seal off one side of a static air duct 36 surrounding piston 25.

A fifth flange of piston 25, provides for a first flange knife 37, that operates to cut first and second hermetic seals, shear nipples 38 and 39, thereby allowing static air flow from a static air inlet port body 41, in cross section, through static air duct 36 to a static air outlet port body 42.

A second piston bore truncation 40 leads to a fourth O-ring seal 43 which is disposed on piston 25 between a sixth and a seventh flange 44 and 45 to seal off the opposite side of static air duct 36 and to seal off a dynamic air duct 46.

An eighth flange of piston 25, provides for a second flange knife 47, that operates to cut third and fourth hermetic seals, shear nipples 48 and 49, thereby allowing dynamic air flow from a dynamic air inlet port body 51 through dynamic air duct 46 to a dynamic air outlet port body 52.

The construction of air inlet and outlet port bodies 41/51 and 42/52 is illustrated by the cross-section of air inlet port body 41. Air inlet port body 41 may comprise a molded body 141 of aluminum through which a longitudinal shaft 142 is drilled to form shear nipple 38 at the distal end. A solder plug 143 is then inserted to close off shaft 142. A larger air hose connecting hole 144 is then drilled 3/4 the way through molded body 141 transverse to and intersecting with longitudinal shaft 142. Air inlet port body 41 is then fitted with an O-ring 61 and inserted in valve housing 12 after piston 25 has been positioned therein. O-ring 61 provides sealed communication between valve housing 12 and inlet port body 41. Port bodies 42, 51 and 52 are fabricated and assembled in a similar manner.

Piston 25 is provided with a truncated tip 53 for friction containment in valve housing 12 truncated end 54. When squib 14 is fired, thereby forcing truncated tip 53 into truncated end 54, piston 25 is held fast in its actuated position.

Inlet port bodies 41 and 51 and outlet ports 42 and 52 are each conventionally provided with bolted clamps 55, 56 and 57, 58, respectively, for firm mounting of each port body to valve housing 12. Each said port body is further provided with port body O-ring seals 61, 62, 63 and 64, for containment of air flows within valve housing 12.

Valve housing 12 is further provided with bolt holes 65, 66, 67 and 68 for mounting dual air valve 11 to a missile interior bulkhead.

Once piston 25 is inserted into valve housing 12, and locking screw 28 has locked piston 25 in its stored position, then pyrotechnic housing 16 is mounted in valve housing 12, and hermetically sealed port body inlets and outlets 41, 51, 42 and 52, are inserted in place as described in the figure. First, second, third and fourth O-ring seals 18, 32, 34 and 43, and inlet/outlet port body O-ring seals 61, 62, 63 and 64, are preferably made of hard but resilient rubber, and snugly fit the volume occupied to seal off the compartments described.

It should be apparent that numerous modifications and variations of the present invention are possible in light of the above teachings. It is therefore to be understood that within the scope of the appended claims the invention may be practiced otherwise than as specifically described herein.

What is claimed is:

1. A dual air valve, comprising:

a housing defining a longitudinal central bore, open at one end and closed on one end, and having a threaded section adjacent said open end, a first diameter bore section extending from said threaded section toward said closed end and a second diameter bore, smaller than said first diameter bore, extending from said first diameter bore section to said closed end, and a truncated conical socket terminating said longitudinal central bore, said housing further defining a first transverse bore completely penetrating said housing at said first diameter bore section, and a second transverse bore completely penetrating said housing at said second diameter bore section;

a valve piston defining a base on one end, first, second, third, fourth, fifth, sixth, seventh and eighth flanges, each being spaced from one another, and a truncated conical tip on the other end compatible with said truncated conical socket in said housing, said first flange defining said base, said first and second flanges defining a slot therebetween, said fifth and eighth flanges defining first and second flange knives, respectively, said valve piston being slidably positioned within said housing for movement between a stored and an actuated position, said first and second flange knives being positioned to move past said first and second transverse bores when said valve piston moves from said stored position to said actuated position, said fourth and fifth flange pair and said seventh and eighth flange pair each defining a space between each flange in each pair for fluid flow when said valve piston is in said actuated position, said fourth and fifth flange pair being positioned to align the space between them with said first transverse bore in said actuated position and said seventh and eighth flange pair being positioned to align the space between them with said second transverse bore in said actuated position;

an electrically initiated high pressure gas generating squib threadedly attached to said threaded section of said housing adjacent said valve piston base, closing said housing open end, and being responsive to an electric signal for pressurizing said base of said valve piston;

a shear pin installed in said housing and partially positioned in said slot between said first and second flanges for releasably retaining said valve piston in said store position;

a plurality of sealing rings positioned about said valve piston between each of said second and third flanges, said third and fourth flanges, and said sixth and seventh flanges, respectively, forming a respective plurality of seals between said valve piston and said housing;

four port bodies each having a central passageway open near one end and extending to a closed, shearably openable tip at the other end, said bodies having a circumferential groove disposed near said shearably openable tip, each of said port bodies being inserted into said housing one in each end of said first and second transverse bores and each of said shearably openable tips extending into said longitudinal central bore for shearing interaction with said flange knives upon motion of said valve piston from said stored position to said actuated position;

a sealing ring disposed around each of said port bodies at said groove for sealing between each of said port bodies and said housing; and means for removably retaining said port bodies within said transverse bores;

whereby said shear pin retains said valve piston in said stored position until an electric signal causes said squib to ignite and pressurize said valve piston base with high pressure gas, causing said first flange to shear said shear pin, and forcing said valve piston to move toward said closed end of said housing and said first flange knife to shear open said tips of said port bodies in said first transverse bore, and said second flange knife to shear open said tips of said port bodies in said second transverse bore, aligning said first and second spaces for fluid flow with said first and second transverse bores respectively, said valve piston truncated conical tip frictionally lodging in said housing truncated conical socket for secure retention of said valve piston in said actuated position, resulting in open flow passages through said first and second transverse bores and inserted port bodies.

\* \* \* \* \*